United States Patent
Wakat

[11] Patent Number: 6,054,128
[45] Date of Patent: Apr. 25, 2000

[54] DIETARY SUPPLEMENTS FOR THE CARDIOVASCULAR SYSTEM

[76] Inventor: Diane Wakat, 16 Canterbury Rd., Charlottesville, Va. 22903

[21] Appl. No.: 08/940,023

[22] Filed: Sep. 29, 1997

[51] Int. Cl.[7] .......................... A61K 35/78; A61K 47/00; A61K 7/09; A23L 1/30
[52] U.S. Cl. ........................ 424/195.1; 424/439; 424/702; 426/648; 426/655; 426/72; 514/824
[58] Field of Search .................................. 424/195.1, 439, 424/451, 456, 464, 489, 702; 426/148, 155, 72; 514/824

[56] References Cited

U.S. PATENT DOCUMENTS

| | | | |
|---|---|---|---|
| 3,764,692 | 10/1973 | Lowenstein | 514/449 |
| 5,514,382 | 5/1996 | Sultenfuss | 424/440 |
| 5,648,377 | 7/1997 | Bombardelli et al. | 514/456 |

OTHER PUBLICATIONS

Bohinc, P. Med. Razgledi, vol. 26 (1), pp. 53–61, abstract enclosed, 1987.

Y. Rong et al., *Biotech. Ther.*, 5(3–4):117–26, 1994–95 (abstract).

T. Bahorun et al., *Arzneimittel–Forschung*, 46(11):1086–9, Nov. 1996 (abstract).

S. Rajendran, *Atherosclerosis*, 123(1–2):235–41, Jun. 1996 (abstract).

M. Schussler et al., *Arzneimittel–Forschung*, 45(8):842–5, Aug. 1995 (abstract).

S. Sinatra et al., *Connecticut Medicine*, 59910):579–88, Oct. 1995 (abstract).

S. Lepage, *Cardiovas. Drugs & Therapy*, 10(5):567–71, Nov. 1996 (abstract).

J. Neve, *J. Cardiovas. Risk*, 3(1):42–7, Feb. 1996 (abstract).

A. Catapano, *Angiology*, 48(1):39–44, Jan. 1997 (abstract).

J. Formica et al., *Food & Chem Toxicol.*, 33(12)1061–80, Dec. 1995 (abstract).

*Primary Examiner*—Leon B. Lankford, Jr.
*Assistant Examiner*—Christopher R. Tate
*Attorney, Agent, or Firm*—Kenyon & Kenyon

[57] ABSTRACT

The present invention relates to dietary supplements for supplementing the dietary needs of human subjects to prevent or reduce the incidence of cardiovascular disease and promote a healthy cardiovascular system.

17 Claims, No Drawings

DIETARY SUPPLEMENTS FOR THE CARDIOVASCULAR SYSTEM

FIELD OF THE INVENTION

The present invention relates to dietary supplements. More particularly, it relates to dietary supplements formulated to reduce risk or progression of cardiovascular disease by addressing the factors that influence the physiology and pathology of the heart, arteries and veins in a concurrent and synergistic manner.

BACKGROUND OF THE INVENTION

Most medical conditions, including cardiovascular disease, are affected by diet, both what is in the diet and what is missing from the diet. The incidence of cardiovascular disease and risks associated with the disease have been shown to be influenced by diet and dietary supplements.

Cardiovascular disease is a major cause of death, killing five times more women than breast cancer and is responsible for nearly one third of all adult male fatalities. In most cases, cardiovascular disease is actually blood vessel disease resulting from the deposit of fatty materials in the inner walls of the arteries, which blocks the flow of blood carrying oxygen and nutrients to the heart muscle. This condition, atherosclerosis, affects everyone. The degree to which an individual is affected is dependent upon a number of factors including age, gender, genetics and various life-style choices, including diet.

More than one and a half million Americans suffer a heart attack each year and for about half of them the heart attack is the first indication that they have a cardiovascular disease. More than 350,000 heart attack sufferers die suddenly from the heart attack before they reach a hospital and receive medical attention.

There are two main strategies for reducing cardiovascular risk from atherosclerosis. One is to reduce cholesterol levels and the other is to prevent the oxidation of low density lipoprotein. The importance of decreasing dietary saturated fat and cholesterol is well established, but a number of other factors appear to influence the risk of cardiovascular disease as well. Oxidation of low density lipoprotein (LDL-lipoprotein) also appears to be involved in the pathogenesis of atherosclerosis. Epidemiological studies suggest a negative correlation between the occurrence of cardiovascular disease and blood concentrations of lipophilic antioxidants such as vitamins A and E and beta-carotene. (Lepage, et al., Cardiovascular Drugs and Therapy, 10(5):567–71, 1996). Studies also indicate that dietary supplements of trace elements, such as selenium, zinc, chromium, magnesium and copper, and vitamin A, which are involved in the activity of many antioxidant enzymes have potential benefit to cardiovascular disease patients. (Lepage, et al.; Durlach, et al., Magnesium Res., 9(2):139–141, 1996; J. Nerve, J. Cardiovascular Res., 3(1):42–47, 1996; Houtman, J. P., J. Cardiovascular Risk, 3(1):18–25, 1996). In particular, the well-known antioxidant properties of selenium have been linked to lower incidence of cardiovascular disease in humans (Badmaev, et al., Alternative Therapies in Health and Medicine, 2(4):59–62, 1996; Kuznetsov, et al., Eksperimentalnaia I Klinicheskaia Farmakologiia, 58(5):26–28, 1995; Salvini, et al., Am. J. Cardiol., 76(17):1218–1221, 1995). It is thought that lipid peroxidation and low antioxidant status are involved in the early phases of atherosclerosis (Bonithon-Kopp, et al., Am. J. Clin. Nutrition, 65(1): 121–127, 1997).

Another major risk factor for the circulatory system is hyperhomocysteinemia. The prooxidant, homocysteine, has been found to be associated with cardiovascular disease. (P. O. Kwiterovich, Jr., J. Am. Dietetic Assoc., 97(7 Suppl): S31–41, 1997). The vitamin B complex, particularly folic acid, $B_{12}$ and $B_6$ are essential in the prevention of hyperhomocysteinemia and dietary folic acid has been shown to lower blood levels of homocysteine (Kwiterovich).

Preventive measures are probably the most effective methods of dealing with cardiovascular disease and such measures should include diet and dietary supplementation. Although the etiology of cardiovascular disease is multifactorial, certain dietary supplements have been shown to provide a statistically significant benefit in reducing the risk or reducing the incidence of cardiovascular disease and associated conditions. However, to date, the approach to micronutrient supplementation has not considered all of the factors associated with the cardiovascular system. Presently, medical interventions focus upon treating hypertension, hypercholesteremia or hyperinsulinemia as a means of reducing risk or progression of cardiovascular disease.

A more multi-dimensional approach that focuses on the cardiovascular system rather than on the individual factors that lead to cardiovascular disease or the individual conditions that affect the cardiovascular system is needed. There is a need for a dietary supplement which concurrently and synergistically addresses the factors that influence the physiology and pathology of the heart, arteries and veins.

SUMMARY OF THE INVENTION

In one aspect of the invention there are provided dietary supplements for supplementing the micronutrient, vitamin and phytochemical needs of a person to simultaneously prevent or reduce the risk of disease of the cardiovascular system. Disease of the cardiovascular system includes, for example, such diseases as atherosclerosis, hypertension, hypercholesterolemia, hyperhomocysteinemia and hyperinsulinemia. The present dietary supplement for supplementing the dietary needs of a person comprises at least one of vitamin $B_6$, vitamin $B_{12}$ and folic acid, in an amount sufficient to reduce the serum homocysteine level of the person; at least one pharmaceutically acceptable antioxidant in an amount sufficient to reduce oxidation of low density lipoproteins; selenium in an amount sufficient to reduce platelet aggregation and modulate prostaglandin synthesis; at least one phytochemical in an amount sufficient to promote vasodilation, relaxation of cardiovascular smooth muscle and platelet disaggregation; extract of hawthorn in sufficient amount to increase coronary blood flow; and extract of *Garcinia cambogia* in an amount sufficient to lower the serum triglyceride level of the person. In a preferred embodiment, the dietary supplement comprises from about 800 μg RE to about 1200 μg RE (retinol equivalent) beta carotene; from about 70 mg to about 250 mg vitamin $B_6$; from about 100 μg to about 1 mg vitamin $B_{12}$; from about 300 μg to about 10 mg folic acid; from about 100 mg to about 600 mg vitamin C; from about 25 mg to about 250 mg vitamin E; from about 50 μg to about 500 μg selenium; from about 5 mg to about 500 mg catechin; from about 5 mg to about 500 mg quercetin; from about 5 mg to about 500 mg of a mixture of cyanidin-procyanidin; from about 50 mg to about 500 mg hawthorn extract; and from about 100 mg to about 500 mg Garcinia cambogia extract.

In another aspect of the present invention there is provided a method for preventing or reducing the risk of cardiovascular disease or reducing the symptoms of existing cardiovascular disease in a person in need thereof, comprising administering to said person a dietary supplement comprising at least one of vitamin $B_6$, vitamin $B_{12}$ and folic acid, in an amount sufficient to reduce the serum homocysteine level of the person; at least one pharmaceutically acceptable antioxidant in an amount sufficient to reduce oxidation of low density lipoproteins; selenium in an amount sufficient to reduce platelet aggregation and modulate prostaglandin synthesis; at least one phytochemical in an amount sufficient to promote vasodilation, relaxation of cardiovascular smooth muscle and platelet disaggregation; extract of hawthorn in sufficient amount to increase coronary blood flow; and extract of *Garcinia cambogia* in an amount sufficient to lower the serum triglyceride level of the person, in admixture with a biologically acceptable carrier In a preferred embodiment of this aspect of the invention the dietary supplement comprises from about 800 μg RE to about 1200 μg RE beta carotene; from about 70 mg to about 250 mg vitamin $B_6$; from about 100 μg to about 1 mg vitamin $B_{12}$, from about 300 μg to about 10 mg folic acid; from about 100 mg to about 600 mg vitamin C; from about 25 mg to about 250 mg vitamin E: from about 50 μg to about 500 μg selenium; from about 5 mg to about 500 mg catechin; from about 5 mg to about 500 mg quercetin; from about 5 mg to about 500 mg of a mixture of cyanidin-procyanidin; from about 50 mg to about 500 mg hawthorn extract; from about 100 mg to about 500 mg *Garcinia cambogia* extract; and from about 100 mg to about 500 mg *Garcinia cambogia* extract.

In yet another aspect of the invention there is provided a dietary supplement comprising a blend of phytochemicals and flavonoids, said blend comprising from about 5 mg to about 500 mg catechin, from about to about 5 mg to about 500 mg quercetin and from about 5 mg to about 500 mg of a mixture of procyanidin-cyanidin.

DETAILED DESCRIPTION OF THE INVENTION

The present invention provides dietary supplements that are designed to meet a person's cardiovascular health needs. This is accomplished by supplying, in the dietary supplements of the invention, a variety of nutrients, vitamins and minerals that address common cardiovascular system health risks. Thus, the dietary supplements of the present invention provide a variety of nutrients, including antioxidants to increase the resistance of LDL (low density lipoprotein) cholesterol to oxidation, elements to improve coronary blood flow to the heart, such as phytochemicals and bioflavonoids, vitamins to prevent or reduce levels of homocysteine and thus protect the endothelial lining of blood vessels and arteries, elements to minimize platelet aggregation and risk of thrombosis and a variety of elements that, in combination, address each of the separate and interactive factors that lead to deterioration in function of one or more of the components of the cardiovascular system. The components of the dietary supplements of the present invention act synergistically, thereby providing a complete, systematic and integrated approach to cardiovascular health.

The synergistic combination of ingredients in the present dietary supplements provides benefits for both primary and secondary prevention of cardiovascular disease. In primary prevention, the present dietary supplements prevent asymptomatic, healthy individuals from developing the physiological and biochemical changes that lead to atherosclerosis and other cardiovascular pathologies, such as hypertension, hypercholesterolemia, hyperhomocysteinemia, hypertriglyceridemia and hyperinsulinemia. The present dietary supplement is also efficacious in reducing or moderating the risk for individuals with already existent pathological changes in either heart or blood vessels or arteries, i.e., secondary prevention.

The dietary supplements of this invention are not meant to replace a well-balanced diet, but are instead intended to supplement a prudent diet. Unlike known broad-based dietary supplements, this invention does not merely provide the prescribed Recommended Daily Allowance (RDA) of micronutrients, but rather is geared to emphasize the disease prevention properties of micronutrient supplementation. Thus, cumulative beneficial and preventive effects should be achieved by dietary supplementation with the dietary supplement of the invention, especially when diligently used throughout the life of an individual.

Aging is associated with an increased production of oxygen free radicals (highly toxic molecules) which contribute to the pathogenesis of many chronic diseases, including cardiovascular disease. This invention is formulated to address this issue. Thus, at least one antioxidant, such as vitamin E, is included in the present dietary supplements, particularly to reduce atherogenicity of LDL cholesterol particles and thereby reduce damage to arterial walls. Am. J. Clin. Nutr., 1991, 53:305S–313S; Lancet, 1996, 347:781–786. Another antioxidant, Vitamin C, may be included to lower the risk of cardiovascular disease. Vitamin E and Vitamin C are believed to work together in a synergistic fashion. Am. J. Clin. Nutr. 1991, 54: 1310S–1314S.

Another lipophilic antioxidant in addition to Vitamin E and Vitamin C, beta-carotene, may be included in the dietary supplements of this invention. These three compounds have been demonstrated by clinical trials to lower LDL cholesterol levels. J. Nutr., 1996, 126(1): 161–7; N. Engl. J. Med., 1995, 333: 276–82; Cardiovascular Drugs & Therapy, 10(50:567–571, 1996.

The amount of each of the antioxidants, vitamin E, vitamin C and beta-carotene, as well as any other pharmaceutically acceptable antioxidant, such as vitamin A for example, is adjusted to provide maximum antioxidant effect. For example, the amount of beta-carotene is in the range of from about 800 μg RE to about 1200 μg RE, preferably from about 900 μg RE to about 1100 μg RE and most preferably about 1000 μg RE (retinol equivalent). The amount of vitamin C included in the present dietary supplement is in the range of from about 100 mg to about 600 mg, preferably from about 200 mg to about 500 mg, and most preferably about 300 mg. Vitamin E is present in the dietary supplements of the invention in an amount of from about 25 mg to about 250 mg, preferably from about 75 mg to about 175 mg, and most preferably, about 100 mg. Preferably, a combination of vitamin C, vitamin E and beta carotene is included in the present dietary supplement.

The present dietary supplement also contains a sufficient amount of at least one vitamin or other compound to reduce the serum homocysteine level. Preferably, vitamin $B_{12}$, vitamin $B_6$ and folic acid, which have each been shown to reduce serum levels of homocysteine, are included in the dietary supplements of this invention. These elements act synergistically to reduce serum homocysteine, high levels of which are associated with coronary heart disease. Am. J. Clin. Nutr., 1992, 55:131–138; New Eng. J. Med., 1992, 32:1832–1835; Am J. Clin. Nutr., 1989, 50:353–358; Connec. Med., 59(10):579–588, 1995. When included in the present dietary supplements, the amount of folic acid in the dietary supplements of this invention is maintained at a range of from about 300 μg to about 10 mg, preferably from about 350 μg to about 5 mg and most preferably about 400 μg, which is the maximum amount allowed by the FDA. The amount of vitamin $B_{12}$ used in the dietary supplements of the invention is in the range of from about 100 μg to about 1 mg, preferably from about 200 μg to about 750 μg and most preferably, about 400 ug. On the other hand, a larger dose of vitamin $B_6$ is included in the present dietary supplement, at a range of from about 70 mg to about 250 mg, preferably from about 90 mg to about 175 mg, and most preferably about 100 mg.

Another component of the dietary supplements of this invention is selenium. Selenium has been shown to increase the activity of the antioxidant enzymes, glutathione peroxidase and superoxide dismutase, and results in increased resistance to low density lipoproteins against oxidative modification, modulation of prostaglandin synthesis and platelet aggregation and protection against heavy metals. Cardiovascular Drugs & Therapy, 10(5):567–571, 1996. Selenium minimizes risk of damage to the heart by free radicals and generally reduces the risk of coronary heart disease. Selenium is present in the dietary supplements of the invention in an amount of from about 50 μg to about 500 μg, preferably from about 75 μg to about 150 μg, and most preferably, about 115 μg.

The present dietary supplements also contain a combination of botanical compounds, including phytochemicals and bioflavonoids. Bioflavonoids, obtained from a variety of plant extracts have been shown to exhibit antioxidant activity and to improve cardiac function. Angiology, 48(1): 39–44, 1997. Phytochemicals included in the present dietary supplements include bioflavonoids, such as for example, mono-acetyl-vitexinrhamnoside, rutin, luteolin-7-glucoside, hyperoside, and preferably quercetin and/or catechin. Preferably, the dietary supplements of the present invention contain combinations of various flavonoids and most preferably, the dietary supplements of the present invention contain a combination of catechin and quercetin. Flavonoids, and in particular, quercetin and catechin have been shown to modify eicosanoid biosynthesis, i.e., have antiprostanoid and anti-inflammatory activity, protect low density LDL from oxidation, i.e., prevent atherosclerotic plaque formation, prevent platelet aggregation, i.e., have antithrombic effect, and promote relaxation of cardiovascular smooth muscle (antihypertensive, antiarrhythmic). Preferably, the present dietary supplements contain about equal amounts of both catechin and quercetin, in the range of from about 5 mg to about 500 mg, preferably in the range of from about 7 mg to about 250 mg, most preferably about 10 mg each. The bioflavonoids can be added to the present dietary supplements in purified form or as part of a plant or other extract, for example.

The phytochemical component of the dietary supplements of the present invention may also include at least one of procyanidin or cyanidin and preferably, contains a mixture of procyanidin and cyanidin. These phytochemicals have antioxidant effect and have been demonstrated to protect vascular endothelial cells from oxidant injury. The procyanidin and cyanidin component of the present dietary supplement may be added as a mixture of both compounds or each may be added separately, in purified form or as an extract. In a preferred embodiment, procyanidin and cyanidin are added as a mixture and most preferably are obtained as an extract from grape seed or other plant containing sufficient amount of these compounds. The cyanidin-procyanidin component of the present dietary supplement is present in an amount of from about 5 mg to about 500 mg, preferably from about 7 mg to about 250 mg, and most preferably about 10 mg. Preferably the cyanidin-procyanidin mixture is obtained as a plant extract containing about 38 to about 40% cyanidin-procyanidin. In a most preferred embodiment of the invention, the dietary supplements contain a total amount of phytochemicals and bioflavonoids, including quercetin, catechin and procyanidin-cyanidin mixture in the range of from about 20 to about 50 mg, preferably from about 25 to about 40 mg and most preferably, about 30 mg.

The dietary supplements of the present invention contain an extract of the plant *Crataegus oxyacantha*, (hawthorn extract). Such extracts from the Crataegus species have been shown to have antithrombic effect, preventing platelet aggregation and atherosclerotic plaque formation in vivo. Food & Chem. Toxicol., 33(12):1061–1080, 1995. Hawthorn extract has also been shown to promote vasodilation and to promote relaxation of cardiac smooth muscle, i.e., antihypertensive and antiarrhythmic effects. Food & Chem. Toxicol., 33(12):1061–1080, 1995; General Pharmacol., 26(7):1565–1570, 1995. Dietary administration of hawthorn extracts results in an increased coronary blood flow and improved coronary function. Arzneimittel-Forschung, 45(8):842–845, 1995. The present dietary composition contains from about 50 mg to about 500 mg hawthorn extract, preferably about 75 mg to about 250 mg, and most preferably, about 100 mg hawthorn extract. Hawthorn extract may be obtained for example by the method disclosed in Arzneimittel-Forschung, 46(1):1086–1089, 1996, Arzneimittel-Forschung, 45(11):1157–1161, 1995 or the method disclosed in Atherosclerosis, 123(1–2):235–241, 1996 or in Planta medica, 62(1):10–13, 1996. Hawthorn extract is also commercially available from Botanicals, Intl., Long Beach, Calif.

Another plant extract contained in the present dietary supplement is an extract of the plant, *Garcinia cambogia*. *Garcinia cambogia* extracts have been demonstrated to decrease the rate of cholesterol synthesis, lower triglyceride levels to provide stable, normalized blood glucose levels. The present dietary composition contains from about 100 mg to about 500 mg *Garcinia cambogia* extract, preferably about 125 mg to about 250 mg, and most preferably, about 150 mg. *Garcinia cambogia* extract may be obtained by any method for preparing plant extracts known in the art and is commercially available from B & D Nutritional Ingredients, Inc., 2794 Loker Avenue West, carlsbad, Calif.

Each of the dietary supplements of this invention are formulated specifically to contain an amount of the above-discussed components sufficient to prevent or reduce health risks associated with cardiovascular disease. Thus, the dietary supplement preferably contains an amount of vitamin $B_6$ and folic acid sufficient to provide cardiac benefit, a sufficient amount of vitamin $B_{12}$ to act in concert with vitamin $B_6$ and folic acid present in the composition to reduce the levels of serum homocysteine, antioxidants to help prevent oxidation of low density lipoproteins, together with a combination of other botanical nutrients known to prevent atherosclerotic plaque formation and beneficially modulate blood flow to the heart and thus provide protection against cardiovascular disease. The dietary supplements of this invention are, therefore, particularly suited to lessen the risk of coronary heart disease occurring in later life.

Optionally, the dietary supplements of this invention may further contain other phytochemicals or compounds known to have beneficial effect on cardiovascular system health. For example, the dietary supplements of this invention may include an amount of other flavonoids than catechin and quercetin, and may optionally further contain phenols, or phytolexins or mixtures thereof. The dietary supplements of the present invention may optionally contain vitamin A, for example, or any other vitamin, mineral, botanical and the like known to have beneficial effect on the cardiovascular system.

Maximum cardiac benefit is obtained by supplementation of the diet with the dietary supplement throughout the entire life cycle; however, benefit is also obtained when supplementation is begun at any time during the life cycle.

It is understood that the phrase "administration throughout the life", as used herein, means continual administration from any time during the life cycle that supplementation is begun.

The dietary supplements of the present invention may be formulated using any pharmaceutically acceptable forms of the vitamins, minerals and other nutrients discussed above, including their salts. Preferred forms are calcium carbonate, magnesium hydroxide or magnesium sulfate, sodium tetraborate, cupric oxide, manganese sulfate, zinc sulfate cholecalciferol, ferrous fumarate, pyridoxine hydrochloride, chromium polynicotmate d-alpha-tocopherol acetate, and ascorbic acid. They may be formulated into capsules, tablets, powders, gels or liquids. The dietary supplements may be formulated as powders, for example, for mixing with consumable liquids such as milk, juice, water or consumable gels or syrups for mixing into other dietary liquids or foods. The dietary supplements of this invention may be formulated with other food or liquids to provide premeasured supplemental foods, such a single serving bars, for example. Flavorings, binders, protein, complex carbohydrates, and the like may be added as needed.

The dietary supplements of the invention are intended for daily administration. Preferably, they are formulated for twice daily administration, but may be formulated in single portions, multiple portions greater than two or as time release compositions for more or less frequent administration; for example, the dietary supplement may be formulated as two tablets for twice daily administration, or as a sustained release capsule for once daily administration. In the latter instance, the capsule is formulated to release the daily amount of nutrients prescribed by the dietary supplements of the invention. For reasons of size (ease of swallowing) or improved bioabsorption or utilization (e.g., before or after a meal or before sleep), a given dosage may be divided into two, three, or more tablets (or capsules, etc.). A daily dosage may be administered as one tablet, as two tablets taken together, or as two tablets taken separately (e.g., one in the morning and one in the evening).

Specific formulations for the dietary supplements are provided below.

Dietary Supplement

A dietary supplement for humans according to the present invention preferably includes from about 800 μg RE to about 1200 μg RE (retinol equivalent) beta carotene, preferably from about 900 μg RE to about 1100 μg RE and most preferably about 1000 μg RE beta carotene; from about 70 mg to about 250 mg vitamin $B_6$, preferably from about 90 mg to about 175 mg, and most preferably about 100 mg vitamin $B_6$; from about 100 μg to about 1 mg vitamin $B_{12}$, preferably from about 200 μg to about 750 μg and most preferably, about 400 μg vitamin $B_{12}$; from about 300 μg to about 10 mg folic acid, preferably from about 350 μg to about 5 mg and most preferably about 400 μg folic acid, which is the maximum amount allowed by the FDA; from about 100 mg to about 600 mg vitamin C, preferably from about 200 mg to about 500 mg, and most preferably about 300 mg vitamin C; from about 25 mg to about 250 mg vitamin E, preferably from about 75 mg to about 175 mg, and most preferably, about 100 mg vitamin E; from about 50 μg to about 500 μg selenium, preferably from abut 75 μg to about 150 μg, and most preferably, about 115 μg selenium; from about 5 mg to about 500 mg catechin, preferably from about 7 mg to about 250 mg, most preferably about 10 mg catechin; from about 5 mg to about 500 mg quercetin, preferably in the range of from about 7 mg to about 250 mg, most preferably about 10 mg quercetin: from about 5 mg to about 500 mg of a mixture of cyanidin-procyanidin, preferably from about 7 mg to about 250 mg, and most preferably about 10 mg procyanidin-cyanidin mixture; from about 50 mg to about 500 mg hawthorn extract, preferably about 75 mg to about 250 mg, and most preferably, about 100 mg hawthorn extract: and from about 100 mg to about 500 mg *Garcinia cambogia* extract, preferably about 125 mg to about 250 mg, and most preferably, about 150 mg *Garcinia cambogia* extract.

In general the range of antioxidants included in me present dietary supplement has been shown to be effective in reducing or preventing oxidation of LDL and therefore preventing or reducing atherosclerotic plaque formation and reducing or preventing free radical damage of cell membranes, including rod blood cells; the amounts of vitamin $B_{12}$, vitamin $B_6$ and folic acid have been shown to reduce serum homocysteine; the amounts of phytochemicals and bioflavonoids has been shown to promote vasodilation, modulate endothelial properties to reduce damage to the inner linings of blood vessels, and promote relaxation of cardiovascular smooth muscle; and the amount of selenium in be present dietary supplements has been shown to protect LDL from oxidation, modulate prostaglandin synthesis, reduce platelet aggregation, reduce free radical risk on the heart muscle: and, overall the combined effect of the present dietary supplements is to help reduce the risk of cardiovascular disease.

A preferred twice daily dietary supplement is shown in Table 1.

TABLE I

DIETARY SUPPLEMENT

| INGREDIENT | AMOUNT |
|---|---|
| Beta-Carotene | 1000 μg RE |
| Vitamin $B_6$ | 100 mg |
| Vitamin $B_{12}$ | 400 μg |
| Folic Acid | 400 μg |
| Vitamin C | 300 mg |
| Vitamin E | 100 mg |
| Selenium | 115 μcg |
| Catechin | 10 mg |
| Quercetin | 10 mg |
| Procyanidin-Cyanidin Mixture | 10 mg |
| Hawthorn Extract | 100 mg |
| Garcinia cambogia Extract | 150 mg |

In a second aspect of the invention there is provided a method for preventing or lessening the risk of cardiovascular associated diseases and health conditions by orally administering a dietary supplement of this invention. In a preferred embodiment, the dietary supplement is administered continually throughout the life of the individual. Preferably, the dietary supplement is administered twice daily in the form of a tablet, capsule, beverage, cereal, confectionary or dietary bar or any other form suitable for oral administration.

The present method for preventing or lessening the risk of cardiovascular disease is effective in the reduction or prevention of atherosclerotic plaque formation, oxidation of LDL, and platelet aggregation and modulates prostaglandin synthesis, modifies eicosonoid biosynthesis, modulates endothelial properties, promotes relaxation of cardiovascular smooth muscle and increases coronary blood flow.

In another aspect of the invention, there is provided a dietary supplementary blend of phytochemicals and bioflavonoids. The dietary supplement of this aspect of the invention is preferably a twice daily supplement containing a mixture of catechin, quercetin and procyanidin-cyanidin in a total amount of less than about 50 mg, preferably less than about 40 mg and most preferably, in an amount of about 30 mg. The blend of phytochemicals and bioflavonoids contains from about 5 mg to about 500 mg catechin, preferably from about 7 mg to about 250 mg, most preferably about 10 mg catechin; from about 5 mg to about 500 mg quercetin, preferably in the range of from about 7 mg to about 250 mg, most preferably about 10 mg quercetin; from about 5 mg to about 500 mg of a mixture of cyanidin-procyanidin, preferably from about 7 mg to about 250 mg, and most preferably about 10 mg procyanidin-cyanidin mixture. The mixture of procyanidin-cyanidin may be obtained from a plant extract, such as grape seed extract, for example, although any source of these compounds may be used. In a preferred embodiment, the blend of catechin, quercetin and cyanidin-procyanidin contains about 10 mg of each of the components, for a total amount of about 30 mg.

The dietary supplementary blend of phytochemicals and bioflavonoids may be provided in tablet or capsule form, for example or formulated in a palatable confection such as a confectionary bar, beverage, cereal, powder and the like. In a preferred embodiment, there is provided a twice daily dietary supplementary blend of phytochemicals and bioflavonoids containing a mixture of catechin, quercetin, procyanidin and cyanidin in a total weight amount of about 30 mg.

EXAMPLE 1

The diet of an individual is supplemented daily with the dietary supplement of this invention. The dietary supplement is administered in tablet form formulated for twice daily administration. Supplementation of the diet is carried out throughout the entire life stage.

EXAMPLE 2

The diet of two adult females (subjects FG and MN in Table 1) and one adult male (subject RI) was supplemented with a daily regimen of the dietary supplement shown in Table 1. The diet of subject FG was supplemented twice daily for ten months; RI's diet was supplemented twice daily for six months and MN's diet was supplemented once daily (half dose) for three months. Prior to beginning the dietary supplementation regimen and at the conclusion of the study a complete blood count was obtained for each subject by standard procedures. The results are shown in table 2.

TABLE 2

| SUBJECT | PRE-DIET CHOLESTEROL (mg/dL) | | AFTER DIET CHOLESTEROL (mg/dL) | |
| --- | --- | --- | --- | --- |
| FG | Total Cholesterol | 202 | Total Cholesterol | 178 |
|  | HDL Cholesterol | 38 | HDL Cholesterol | 63 |
|  | Triglycerides | 172 | Triglycerides | 114 |
| RI | Total Cholesterol | 255 | Total Cholesterol | 205 |
| MN (half dose) | Total Cholesterol | 244 | Total Cholesterol | 219 |

What is claimed is:

1. A dietary supplement for promoting a healthy cardiovascular system of a human subject, comprising at least one of vitamin $B_6$, vitamin $B_{12}$ and folic acid, in an amount sufficient to reduce the serum homocysteine level of the subject; at least one pharmaceutically acceptable antioxidant in an amount sufficient to reduce oxidation of low density lipoproteins; selenium in an amount sufficient to reduce platelet aggregation and modulate prostaglandin synthesis; at least one phytochemical in an amount sufficient to promote vasodilation, relaxation of cardiovascular smooth muscle and platelet disaggregation, said phytochemical selected from the group consisting of monoacetylvitexrhamnoside, rutin, luteolin-7-glucoside, hyperoside, quercetin, catechin, procyanidin, cyanidin and combinations thereof; extract of hawthorn in sufficient amount to increase coronary blood flow; and extract of *Garcinia cambogia* in an amount in the range of from about 100 to about 500 mg, in admixture with a biologically acceptable carrier.

2. The dietary supplement of claim 1 wherein the supplement comprises a combination of vitamin $B_6$, vitamin $B_{12}$ and folic acid in an amount sufficient to reduce the serum homocysteine level of the subject; vitamin E, vitamin C and beta carotene; selenium in an amount sufficient to reduce platelet aggregation and modulate prostaglandin synthesis; at least one phytochemical in an amount sufficient to promote vasodilation, relaxation of cardiovascular smooth muscle and platelet disaggregation selected from the group consisting of catechin, quercetin, procyanidin-cyanidin and combinations thereof; extract of hawthorn in sufficient amount to increase coronary blood flow; and extract of *Garcinia cambogia* in an amount in the range of from about 100 mg to about 500 mg.

3. The dietary supplement of claim 1 wherein the supplement comprises from about 800 μg retinol equivalent (RE) to about 1200 μg RE beta carotene; from about 70 mg to about 250 mg vitamin $B_6$; from about 100 μg to about 1 mg vitamin $B_{12}$; from about 300 μg to about 10 mg folic acid; from about 100 mg to about 600 mg vitamin C; from about 25 mg to about 250 mg vitamin E; from about 50 μg to about 500 μg selenium; from about 5 mg to about 500 mg catechin; from about 5 mg to about 500 mg quercetin; from about 5 mg to about 500 mg of a mixture of cyanidin-procyanidin; from about 50 mg to about 500 mg hawthorn extract; and from about 100 mg to about 500 mg *Garcinia cambogia* extract.

4. The dietary supplement of claim 1 wherein the supplement comprises from about 900 μg RE to about 1100 μg RE beta carotene; from about 90 mg to about 175 mg vitamin $B_6$; from about 200 μg to about 750 μg vitamin $B_{12}$; from about 350 μg to about 5 mg folic acid; from about 200 mg to about 500 mg vitamin C; from about 75 mg to about 175 mg vitamin E; from about 75 μg to about 150 μg selenium; from 7 mg to about 250 mg catechin; from about 7 mg to about 250 mg quercetin; from about 7 mg to about 250 mg of a mixture of procyanidin-cyanidin; from about 75 mg to about 250 mg hawthorn extract; and from about 125 mg to about 250 mg *Garcinia cambogia* extract.

5. The dietary supplement of claim 1 wherein the supplement is formulated in tablet, powder, liquid, capsule or gel form, or as a dietary bar.

6. The dietary supplement of claim 5 wherein said supplement is formulated for twice daily administration.

7. The dietary supplement of claim 1 wherein the supplement comprises about 1000 μg RE beta carotene; about 100 mg vitamin $B_6$; about 400 μg vitamin $B_{12}$; about 400 μg folic acid; about 300 mg vitamin C; about 100 mg vitamin E; about 115 μg selenium; about 10 mg catechin; about 10 mg quercetin; about 10 mg procyanidin-cyanidin mixture; 100 mg hawthorn extract; and about 150 mg *Garcinia cambogia* extract.

8. The dietary supplement of claim 1 wherein the procyanidin-cyanidin is in the form of a plant extract.

9. The dietary supplement of claim 1 wherein the at least one phytochemical is present in an amount of at least about 30 mg.

10. A method for preventing or reducing the risk of cardiovascular disease or reducing the symptoms of existing cardiovascular disease in a person in need thereof, comprising administering to said person a dietary supplement comprising at least one of vitamin $B_6$, vitamin $B_{12}$ and folic acid, in an amount sufficient to reduce the serum homocysteine level of the person; at least one pharmaceutically acceptable antioxidant in an amount sufficient to reduce oxidation of low density lipoproteins; selenium in an amount sufficient to reduce platelet aggregation and modulate prostaglandin synthesis; at least one phytochemical in an amount sufficient to promote vasodilation, relaxation of cardiovascular smooth muscle and platelet disaggregation, said phytochemical selected from the group consisting of monoacetylvitexrhamnoside, rutin, luteolin-7-glucoside, hyperoside, quercetin, catechin, procyanidin, cyanidin and combinations thereof; extract of hawthorn in sufficient amount to increase coronary blood flow; and extract of *Garcinia cambogia* in an amount in the range of from about 100 mg to about 500 mg, in admixture with a biologically acceptable carrier, whereby formation of atherosclerotic plaque is inhibited and blood flow to the heart is beneficially modulated.

11. The method of claim 10 wherein the dietary supplement administered to the person in need thereof comprises a combination of vitamin $B_6$, vitamin $B_{12}$ and folic acid in an amount sufficient to reduce the serum homocysteine level of the subject; vitamin E, vitamin C and beta carotene; selenium in an amount sufficient to reduce platelet aggregation and modulate prostaglandin synthesis; at least one phytochemical in an amount sufficient to promote vasodilation, relaxation of cardiovascular smooth muscle and platelet disaggregation selected from the group consisting of catechin, quercetin, procyanidin-cyanidin and combinations thereof; extract of hawthorn in sufficient amount to increase coronary blood flow; and extract of *Garcinia cambogia* in an amount in the range of from about 100 mg to about 500 mg.

12. The method of claim 10 wherein the supplement comprises from about 800 µg RE to about 1200 µg RE beta carotene; from about 70 mg to about 250 mg vitamin $B_6$; from about 100 µg to about 1 mg vitamin $B_{12}$; from about 300 µg to about 10 mg folic acid; from about 100 mg to about 600 mg vitamin C; from about 25 mg to about 250 mg vitamin E; from about 50 µg to about 500 µg selenium; from about 5 mg to about 500 mg catechin; from about 5 mg to about 500 mg quercetin; from about 5 mg to about 500 mg of a mixture of cyanidin-procyanidin; from about 50 mg to about 500 mg hawthorn extract; and from about 100 mg to about 500 mg *Garcinia cambogia* extract.

13. The method of claim 10 wherein the supplement comprises from about 900 µg RE to about 1100 µg RE beta carotene; from about 90 mg to about 175 mg vitamin $B_6$; from about 200 µg to about 750 µg vitamin $B_{12}$; from about 350 µg to about 5 mg folic acid; from about 200 mg to about 500 mg vitamin C; from about 75 mg to about 175 mg vitamin E; from about 75 µg to about 150 µg selenium; from 7 mg to about 250 mg catechin; from about 7 mg to about 250 mg quercetin; from about 7 mg to about 250 mg of a mixture of procyanidin-cyanidin; from about 75 mg to about 250 mg hawthorn extract; and from about 125 mg to about 250 mg *Garcinia cambogia* extract.

14. The method of claim 10 wherein the dietary supplement is administered in the form of a tablet, powder, liquid, capsule, gel or dietary bar.

15. The method of claim 10 wherein the dietary supplement is administered twice daily.

16. The method of claim 10 wherein the dietary supplement comprises about 1000 µg RE beta carotene; about 100 mg vitamin $B_6$; about 400 µg vitamin $B_{12}$; about 400 µg folic acid; about 300 mg vitamin C; about 100 mg vitamin E; about 115 µg selenium; about 10 mg catechin; about 10 mg quercetin; about 10 mg procyanidin-cyanidin mixture; 100 mg hawthorn extract; and about 150 mg *Garcinia cambogia* extract.

17. The method of claim 16 wherein the procyanidin-cyanidin mixture is obtained from grape seed extract.

\* \* \* \* \*